United States Patent
Wigmore et al.

(10) Patent No.: US 9,569,367 B1
(45) Date of Patent: Feb. 14, 2017

(54) CACHE EVICTION BASED ON TYPES OF DATA STORED IN STORAGE SYSTEMS

(71) Applicant: EMC Corporation, Hopkinton, MA (US)

(72) Inventors: Ian Wigmore, Westborough, MA (US); Marik Marshak, Newton, MA (US); Arieh Don, Newton, MA (US); Alexandr Veprinsky, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 151 days.

(21) Appl. No.: 14/196,308

(22) Filed: Mar. 4, 2014

(51) Int. Cl.
G06F 12/08 (2016.01)
G06F 12/12 (2016.01)
G06F 11/14 (2006.01)

(52) U.S. Cl.
CPC ......... G06F 12/0891 (2013.01); G06F 12/121 (2013.01); G06F 11/1448 (2013.01)

(58) Field of Classification Search
None
See application file for complete search history.

(56) References Cited

U.S. PATENT DOCUMENTS

| 8,429,351 B1 * | 4/2013 | Yu | G06F 12/02 711/132 |
| 2007/0156964 A1 * | 7/2007 | Sistla | G06F 12/00 711/133 |

* cited by examiner

*Primary Examiner* — Reginald Bragdon
*Assistant Examiner* — Edward Wang
(74) *Attorney, Agent, or Firm* — Blakely, Sokoloff, Taylor & Zafman LLP (57) ABSTRACT

Exemplary methods for improving cache utilization include in response to receiving a request to store data, storing the data in one of a plurality of cache slots of a cache. In one embodiment, the methods further include after storing the data, setting a status of the cache slot as write pending to indicate that the cache slot contains data which needs to be written to a corresponding destination storage device. The methods include determining an eviction type of the cached data based on whether the destination storage device is a local storage device or a remote storage device. In one embodiment, after copying data from the cache slot to the corresponding destination storage device, marking the cache slot with the determined eviction type. In response to receiving another request to store data, evicting at least one of the cache slots based on the eviction type.

18 Claims, 5 Drawing Sheets

FIG. 5

CACHE EVICTION BASED ON TYPES OF DATA STORED IN STORAGE SYSTEMS

FIELD

Embodiments of the invention relate to storage systems; and more specifically, to improving cache utilization on a storage system.

BACKGROUND

A typical data storage system includes a cache (i.e., a block of memory) that stores data so that future requests for that data can be served faster. The data that is stored within a cache might be values that have been computed earlier or duplicates of original values that are stored elsewhere. If the requested data is contained in the cache (herein referred to as a cache hit), this request can be served by simply reading the cache, which is comparatively faster. On the other hand, if the requested data is not contained in the cache (herein referred to as a cache miss), the data has to be recomputed or fetched from its original storage location, which is comparatively slower. Hence, the greater the number of requests that can be served from the cache, the faster the overall system performance becomes.

To be cost efficient and to enable an efficient use of data, caches are relatively small. Nevertheless, due to access patterns in typical computer applications, caches have proven themselves in data storage systems to have temporal locality, which refers to the reuse of specific data in the cache within a relatively small time duration. Conventional storage systems fail to leverage off this phenomenon, resulting in inefficient cache utilization.

Figure 1:
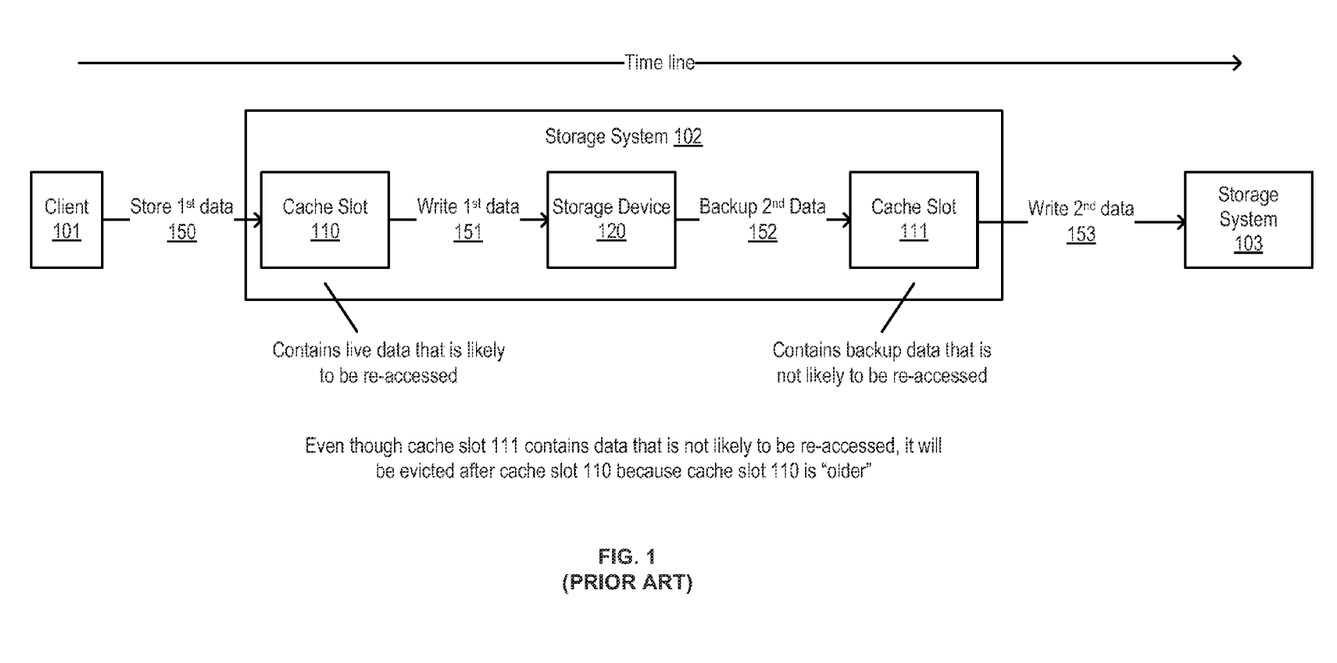
FIG. 1 is a block diagram illustrating a conventional storage system.

FIG. 1 illustrates a conventional system wherein client 101 (e.g., a laptop) is connected to storage system 102, which in turn is connected to storage system 103. Storage system 102 includes a cache which is made up of cache slots 110-111. Storage system 102 also includes storage device 120. In the illustrated example, at operation 150, client 101 stores a first data to storage system 102. The first data is initially buffered in cache slot 110. At operation 151, the first data is fetched from cache slot 110 and written to storage device 120.

Subsequently, storage system 102 performs a backup of a second data from storage device 120 to storage system 103. As part of this backup, at operation 152, storage system 102 writes the second data to cache slot 111, and then at operation 153, the second data is read from cache slot 111 and written to its backup storage system 103. A conventional storage system evicts cache slots based on an aging algorithm wherein the "oldest" cache slot is freed for reuse. In this example, cache slot 110 is older than cache slot 111 because cache slot 110 was populated with data earlier in time. Thus, cache slot 110 is freed for reuse before cache slot 111, even though cache slot 110 contains "live" data (which is likely to be re-accessed soon) while cache slot 111 contains backup data (which is less likely to be re-accessed any time soon).

BRIEF DESCRIPTION OF THE DRAWINGS

Embodiments of the invention are illustrated by way of example and not limitation in the figures of the accompanying drawings in which like references indicate similar elements.

DESCRIPTION OF EMBODIMENTS

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device or a computing device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

Figure 2:
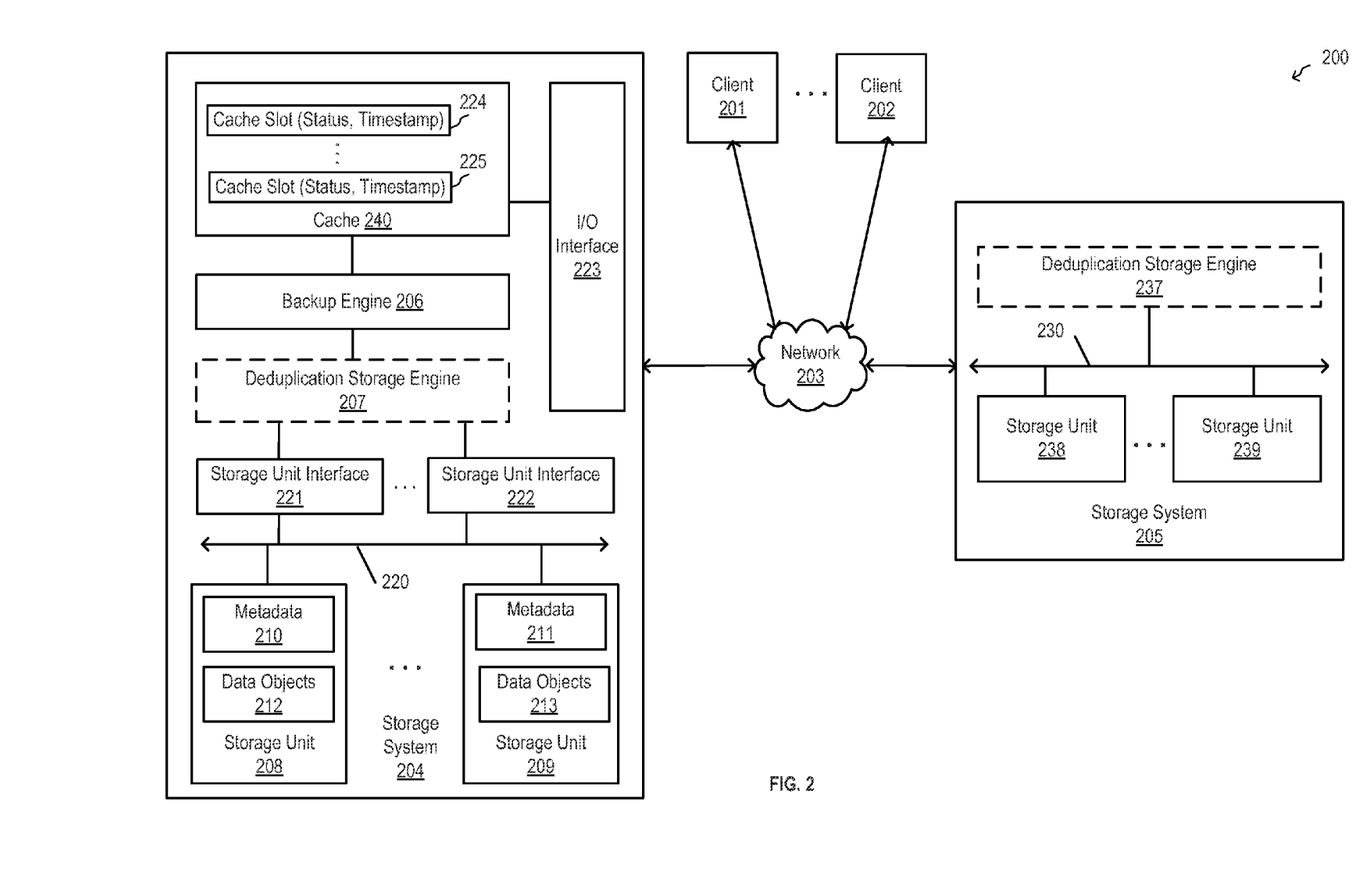
FIG. 2 is a block diagram illustrating a storage system according to one embodiment.

FIG. 2 is a block diagram illustrating a storage system according to one embodiment of the invention. Referring to FIG. 2, system 200 includes, but is not limited to, one or more client systems 201-202 communicatively coupled to storage system 204 and storage system 205 over network 203. Clients 201-202 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 203 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 205 includes optional deduplication storage engine 237 communicatively coupled to storage units 238-239 via interconnect 230, which may be a bus and/or a network. In one embodiment, deduplication storage engine 237 is configured to perform operations similar to optional deduplication storage engine 207 (described in further details below), and storage units 238-239 are configured to store data similar to those stored in storage units 208-209 (described in further details below).

Storage system 204 may include any type of server or cluster of servers. For example, storage system 204 may be a storage server used for any of various different purposes, such as to provide multiple users with access to shared data and/or to back up mission critical data. Storage system 204 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 204 may have a distributed architecture, or all of its components may be integrated into a single unit. Storage system 204 may be implemented as part of an archive and/or backup system such as a storage system available from EMC® Corporation of Hopkinton, Mass.

In one embodiment, storage system 204 includes, but is not limited to, backup engine 206, deduplication storage engine 207, and one or more storage units 208-209 communicatively coupled to each other. Backup engine 206 is configured to backup data from one or more source storage devices to one or more destination storage devices. The source and destination/target storage devices can be internal, external, or a combination of both. Storage units 208-209 may be implemented locally (e.g., single node operating environment) or remotely (e.g., multi-node operating environment) via interconnect 220, which may be a bus and/or a network. In one embodiment, one of the storage units 208-209 operates as an active storage to receive and store external or fresh user data, while the other storage unit operates as a target storage unit to periodically archive data from the active storage unit according to an archiving policy or scheme. Storage units 208-209 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 208-209 may also be a combination of such devices. In the case of disk storage media, the storage units 208 209 may be organized into one or more volumes of Redundant Array of Inexpensive Disks (RAID).

In response to data (e.g., a data file) to be stored in storage units 208-209, optional deduplication storage engine 207 is configured to segment the data into multiple chunks according to a variety of segmentation policies or rules. Deduplication storage engine 207 may choose not to store a chunk in a storage unit if the chunk has been previously stored in the storage unit. In the event that deduplication storage engine 207 chooses not to store the chunk in the storage unit, it stores metadata enabling the reconstruction of the data using the previously stored chunk. As a result, chunks of the data are stored in a deduplicated manner, either within each of storage units 208-209 or across at least some of storage units 208-209. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 210-211, may be stored in at least some of storage units 208-209, such that data can be accessed independent of another storage unit. Metadata of each storage unit includes enough information to provide access to the data it contains. In one embodiment, metadata may include fingerprints contained within data objects 212-213, where a data object may represent a data chunk, a CR of data chunks, or a container of one or more CRs. Fingerprints are mapped to a particular data object via metadata 210-211, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any data not stored in the failed storage unit. When data is deleted, the metadata associated with the data in the system is updated to reflect that the data has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 2 may be used as a tier of storage in a storage hierarchy that comprises other tiers of storage. One or more tiers of storage in this hierarchy may utilize different kinds of storage devices and/or may be optimized for different characteristics such as random update performance. Data are periodically moved among the tiers based on data management policies to achieve a cost-effective match to the current storage requirements of the data. For example, data may initially be stored in a tier of storage that offers high performance for reads and writes. As the data ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

In one embodiment, storage system 204 includes one or more network interfaces (not shown) for communicating with other networked devices (e.g., clients 201-202). A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

According to one embodiment, storage system 204 includes input/output (I/O) interface 223 configured to interface storage system 204 with another networked device (e.g., clients 201-202). For example, I/O interface 223 can be configured to receive request from clients 201-202 to read/write data from storage units 208-209 via cache 240. In one embodiment, storage system 204 includes one or more storage unit interfaces, such as storage unit interfaces 221-222, configured to move data from an internal storage device (e.g., storage units 208-209) and/or an external storage device (e.g., storage system 205) to one or more of cache slots 224-225. Storage unit interfaces 221-222 are also configured to move data from one or more of cache slots 224-225 to an internal storage device (e.g., storage units 208-209) and/or external storage device (e.g., storage system 205). In one embodiment, storage unit interfaces 221-222 are configured to maintain/update the status and timestamp of the cache slots that they push data into and/or pop data from.

In one aspect of the invention, cache 240 is partitioned into a pool of slots (i.e., entries). In the illustrated embodiment, cache 240 is made up of cache slots 224-225. It shall be understood, however, that cache 240 can be partitioned into more or less cache slots than as shown.

In one embodiment, each of cache slots 224-225 includes data, a status, and a timestamp. A cache slot status includes information indicating whether the data contained therein needs to be serviced (e.g., a write-pending (WP) status indicates that the data needs to be moved/written to a destination storage device). Throughout the description, a cache slot with a WP status may simply be referred to as a WP cache slot, and a cache slot with a non-WP status may simply be referred to as a non-WP cache slot. In one embodiment, when data is pushed/written into a cache slot, the respective cache slot is marked as WP (i.e., the respective status is updated to be WP). Once data is popped/read from the cache slot and written to its destination storage device, the respective cache slot is marked as non-WP (i.e., the respective status is updated to be non-WP), indicating that the data in the cache slot has been serviced.

In one embodiment, the status may include information indicating which storage unit interface is responsible for moving data out of the cache and storing it in the destination storage device. Thus, for example, in an embodiment where storage system 204 includes multiple storage unit interfaces, each storage unit interface can determine whether it is responsible for servicing the WP cache slot. In one embodiment, cache slots 224-225 include information indicating the source and target of the data contained therein. Such information may be used, for example, in determining whether data stored in the cache slot is live or backup data.

In one embodiment, the cache slot timestamp includes the time of when the data was pushed into the cache slot, or the time of when the data was popped from the cache slot. The timestamp can be used for cache slot eviction purposes. For example, when data is first written to the cache slot, its timestamp is updated to include the current time. Subsequently, if the data is read from cache, e.g., by a client such as clients 201-202, the timestamp is once again updated with the current time. Thus, when the same data is accessed over and over again, the cache slot timestamp is updated each time to indicate that the data is relevant, and the cache slot should not be evicted. As used herein, data is "relevant" if it is likely to be re-accessed in the near future, e.g., by a client such as clients 201-202. Cache slots 224-225 may include other information without departing from the broader scope and spirit of the present invention.

Typically, when a client needs to access data from a storage system, the storage system first checks the cache. If the requested data can be found in the cache (i.e., a cache hit), the data in the cache is used instead of fetching the requested data from the storage device, resulting in a faster access. On the other hand, when the storage system determines that the requested data does not exist in the cache (i.e., a cache miss), the requested data is fetched from the storage device, resulting in a slower access.

During a cache miss, the storage system evicts a cache slot in order to make room for the new requested data. As used herein, evicting a cache slot refers to the reusing of the cache slot to store new data. The heuristic used to select the cache slot to evict is known as the replacement policy. One popular replacement policy, "least recently used" (LRU), replaces the least recently used cache slot. Evicting a cache slot based strictly on the LRU policy, however, results in an inefficient use of the cache. For example, as set forth above, live data may be contained in a "least recently used" cache slot, and backup data may be stored in a "more recently used" cache slot. Evicting the least recently used cache slot, in such a scenario, results in an inefficient use of the cache because the more recently used cache slot is retained even though its data is not relevant. An embodiment of the present invention overcomes these limitations by performing cache eviction based not only on the concept of LRU, but further based on temporal locality. Various embodiments of the present invention shall become apparent through the discussion of other figures below, in which like references indicate similar elements.

Figure 3:
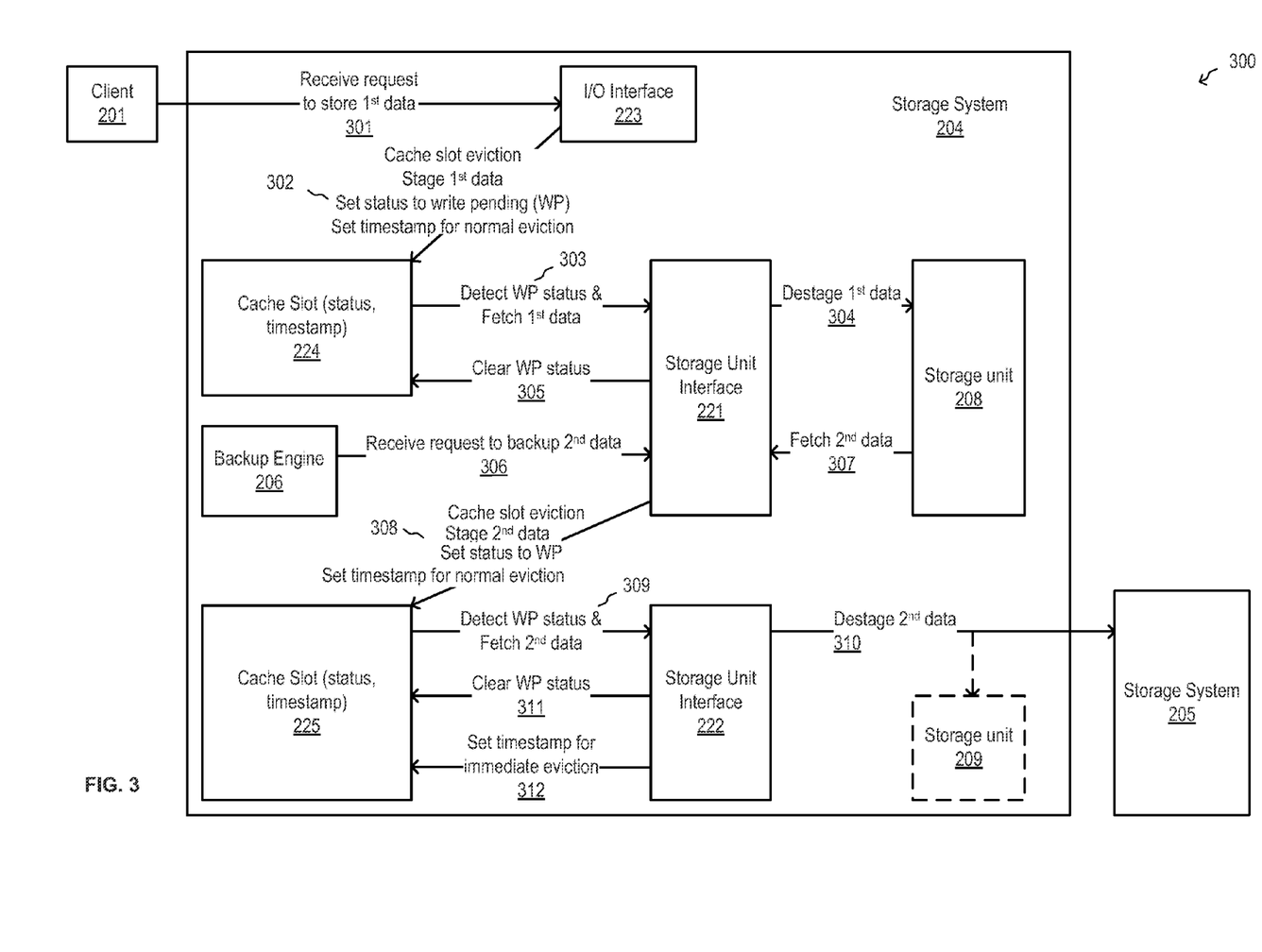
FIG. 3 is a transaction diagram illustrating the transactions for improving cache utilization according to one embodiment.

FIG. 3 is a transaction diagram illustrating the transactions for performing efficient cache slot eviction according one embodiment. System 300 of FIG. 3 is similar to system 200 of FIG. 2, except that some details have been omitted in order to avoid obscuring the invention. Referring now to FIG. 3, during transaction 301, I/O interface 223 receives a request from a client (e.g., client 201) to store a first data (e.g., user data). During transaction 302, in response to the request, I/O interface 223 performs cache slot eviction. In one embodiment, an eviction process includes finding all non-WP cache slots. A WP status indicates that the data stored in the cache slot needs to be serviced, and thus, prevents the respective cache slot from being considered as a candidate for eviction. Accordingly, during the eviction process, if all cache slots contain a WP status, the request is stalled until a non-WP cache slot becomes available.

Once a set of one or more non-WP cache slots are found, I/O interface 223 determines which of the non-WP cache slots is the "oldest" based on the timestamps of the non-WP cache slots. In one embodiment, the oldest non-WP cache slot is evicted. Throughout the description, cache slots are referred to as "old" and "young". As used herein, an "old" cache slot refers to a cache slot with a smaller timestamp value than a "young" cache slot. That is, by setting a time stamp value, a younger cache slot can appear as if it had been accessed more recently than an older cache slot with respect to a particular point in time. This convention assumes that the system time moves forward (i.e., counts up). One having ordinary skill in the art would recognize, however, that the concept of cache slot age can be implemented using other conventions without departing from the broader scope and spirit of the present invention.

As part of transaction 302, I/O interface 223 stages the first data into the evicted cache slot (in this example, cache slot 224). As used herein, staging data refers to the writing/pushing of data into a cache slot. After the first data has been staged in the cache slot, I/O interface 223 marks cache slot 224 as WP. I/O interface 223 also sets the timestamp of cache slot 224 for normal eviction. As used herein, setting a timestamp for "normal eviction" refers to the setting of the timestamp such that the cache slot is evicted in a normal/fair manner, for example, the oldest non-WP cache slot is evicted first. Throughout the description, setting the timestamp of a cache slot for normal eviction may simply be referred to as marking the cache slot for normal eviction. In one embodiment, marking a cache slot for normal eviction refers to setting the timestamp with the current system time.

According to one embodiment, storage system 204 includes a WP pyramid. As used herein, a WP pyramid refers to a data structure that includes information indicating which of the cache slots are WP. According to one embodiment, each of storage unit interfaces 221-222 scans the WP pyramid to determine whether a WP cache slot exists which requires servicing. In this example, at transaction 303, storage unit interface 221 determines that cache slot 224 is WP and fetches the first data from the cache slot. At transaction 304, storage unit interface 221 destages the fetched first data to its destination (in this example, storage unit 208). As used herein, destaging data refers to the writing of data from a cache slot to its destination storage. At transaction 305, storage unit interface 221 clears the WP status of cache slot 224 after the first data has been serviced (i.e., copied to storage unit 208). In some embodiments, when the WP status is cleared, the respective timestamp may also be updated with the current time (not shown).

In one embodiment, storage unit interfaces 221-222 can detect requests to perform backup (e.g., from clients 201-202 and/or backup engine 206). In the illustrated example, at transaction 306, storage unit interface 221 receives a request from backup engine 206 to backup a second data. At transaction 307, in response to the backup request, storage unit interface 221 fetches/reads the second data from its source storage (in this example, storage unit 208).

At transaction 308, storage unit interface 221 performs cache slot eviction using mechanisms similar to those described above. In this example, storage unit interface 221 evicts cache slot 225, and stages the fetched second data into it. As part of transaction 308, storage unit interface 221 marks cache slot 225 as WP, and marks cache slot 225 for normal eviction.

At transaction 309, storage unit interface 222 determines that cache slot 225 is WP and fetches the second data from the cache slot. At transaction 310, storage unit interface 222 destages the fetched second data to its destination, in this example, storage system 205 which may be a remote storage system over a network. Note, however, that the second data can be destaged to an internal storage unit such as storage unit 209. At transaction 311, storage unit interface 222 clears the WP status of cache slot 225 after the second data has been serviced (i.e., copied to storage system 205). In some embodiments, when the WP status is cleared, the respective timestamp may also be updated with the current time (not shown).

According to one embodiment, after clearing the WP status, storage unit interfaces 221-222 are configured to determine whether to update the timestamp of the respective cache slot for immediate eviction. As used herein, setting a timestamp for "immediate eviction" refers to the setting of the timestamp such that the cache slot is evicted even though it is not truly the oldest cache slot in the cache. Throughout the description, setting the timestamp of a cache slot for immediate eviction may simply be referred to as marking the cache slot for immediate eviction. In one embodiment, marking a cache slot for immediate eviction refers to setting the timestamp of the respective cache slot with a value of zero.

According to one embodiment, storage unit interfaces 221-222 determine whether to mark a cache slot for immediate eviction based on whether the data contained in the cache slot is relevant (e.g., whether it is live data or backup data). In one such embodiment, storage unit interfaces 221-222 mark a cache slot for immediate eviction if it is not relevant (e.g., contains backup data which is not likely to be re-accessed soon).

According to one embodiment, the determination of whether live data or backup data has been staged in the cache slot is made based on the configuration of the destaging storage unit interface and the destination storage identity. For example, if the destaging storage unit interface has been configured (e.g., by a system operator) to destage only live data, then such storage unit interface will not mark a cache slot for immediate eviction once the data has been destaged. In one aspect of the invention, if the destaging storage unit interface has been configured to destage both live data and backup data, then such the storage unit interface determines whether the destination storage is a remote storage unit. If so, the storage unit interface will mark the cache slot for immediate eviction after the data has been destaged to the remote destination storage. It shall be appreciated that other mechanisms for determining whether live data or backup data has been staged in the cache slot can be employed without departing from the broader scope and spirit of the present invention. Referring still to FIG. 3, in this example, at transaction 312, storage unit interface 222 determines that data staged in cache slot 225 is backup data, and marks the cache slot for immediate eviction. Thus, in this example, cache slot 225 will be evicted and freed for reuse before cache slot 224 is evicted, even though cache slot 225 is "younger" than cache slot 224.

Figure 4:
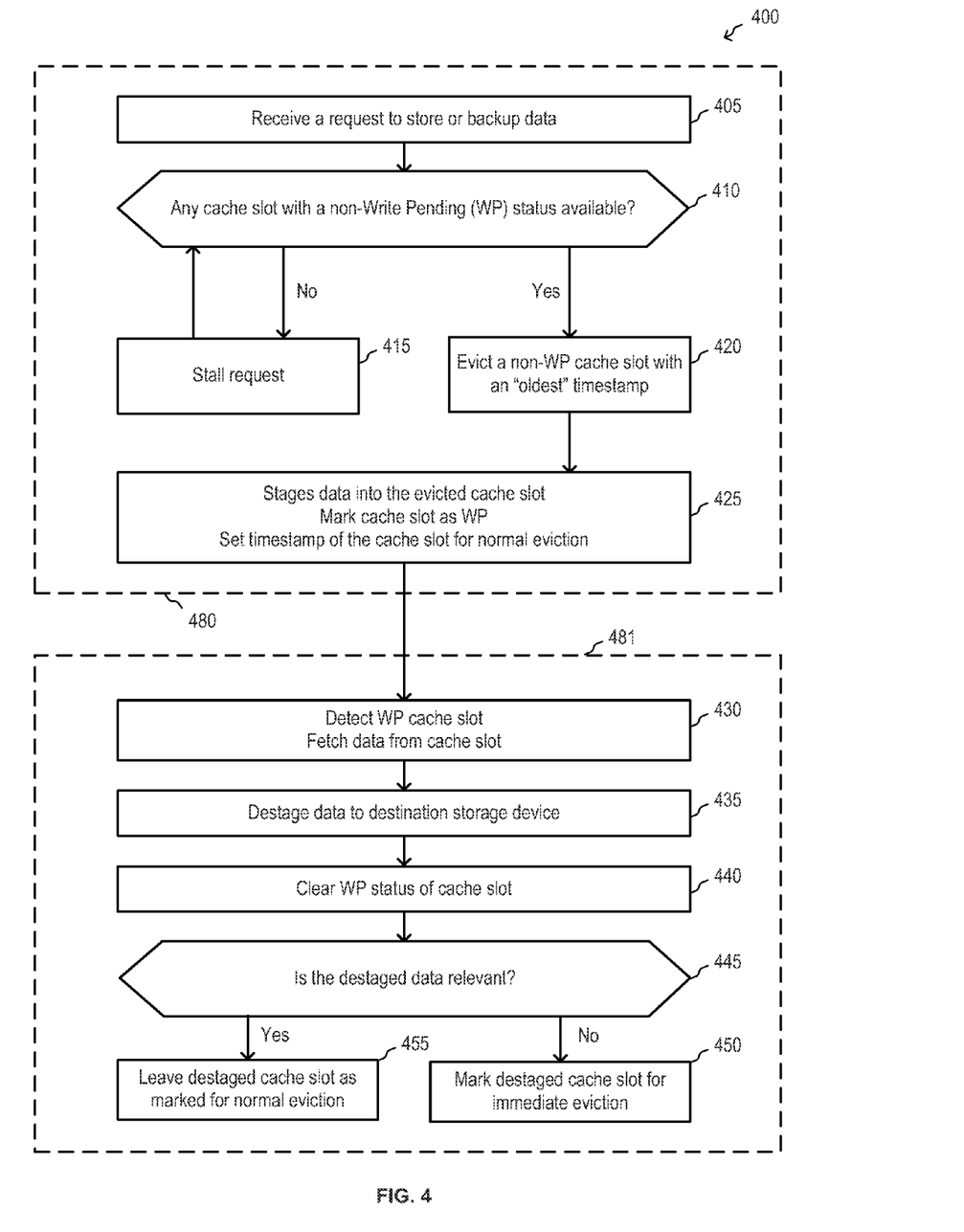
FIG. 4 is a flow diagram illustrating the transactions for improving cache utilization according to one embodiment.

FIG. 4 is a flow diagram illustrating method 400 for improving cache utilization according to one embodiment. For example, method 400 can be performed by storage system 204, which can be implemented as software, firmware, hardware, or any combination thereof. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

Referring now to FIG. 4. At block 405, the storage system receives a request to store or backup data (e.g., as part of transaction 301 or transaction 306). At block 410, the storage system determines if any non-WP cache slot is available. At block 415, if no non-WP cache slot is available (i.e., all cache slots are WP), the storage system stalls the request, and then returns back to block 410 to determine if any non-WP cache slot has become available. Otherwise, at block 420, the storage system evicts the oldest non-WP cache slot. At block 425, the storage system stages the data into the evicted cache slot, and marks the evicted cache slot as WP. As part of block 425, the storage system marks the cache slot for normal eviction. By way of example, blocks 410-425 are performed as part of transaction 302 or 308.

At block 430, the storage system detects a WP cache slot and fetches the data from the cache slot (e.g., as part of transaction 303 or 309). At block 435, the storage system destages the data from the cache slot to a destination storage device (e.g., as part of transaction 304 or transaction 310). At block 440, after the data has been destaged, the storage system clears the WP status of the cache slot (e.g., as part of transaction 305 or 311). At block 445, the storage system determines whether the destaged data is relevant (e.g., whether it was part of a store or backup process). At block 450, in response to determining the destaged data is not relevant (e.g., part of a backup process), the storage system marks the destaged cache slot for immediate eviction so that it can be evicted before other cache slots marked for normal eviction. At block 455, in response to determining that the destaged data is relevant (e.g., not part of a backup process), the storage system leaves the destaged cache slot marked for normal eviction.

Method 400 has been described as a sequence of operations. It shall be understood, however, that method 400 is not so limited. Method 400 can be implemented in various other sequences without departing from the broader scope and spirit of the present invention. Loop 480 includes the operations for staging data and loop 481 includes the operations for destaging data, according to one embodiment. One having ordinary skill in the art would recognize that loops 480 and 481 can be performed in parallel.

Figure 5:
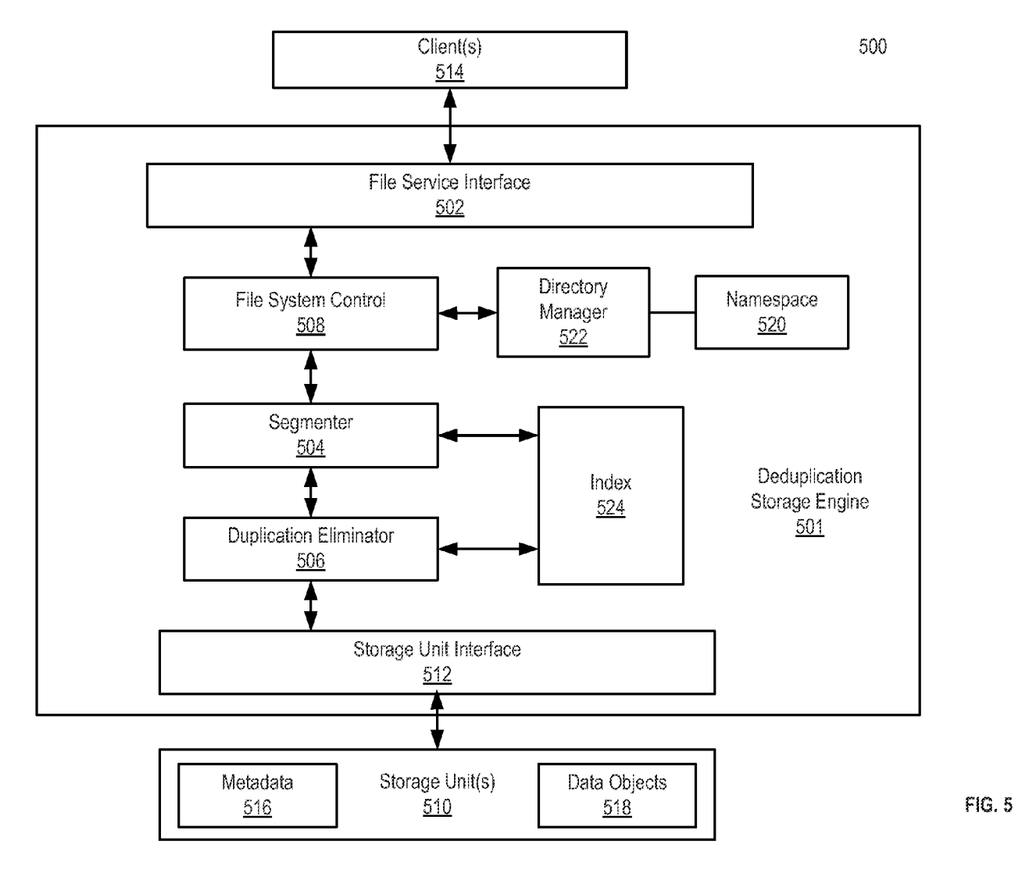
FIG. 5 is a block diagram illustrating a deduplication storage engine which can be used with embodiments of the invention.

FIG. 5 is a block diagram illustrating a deduplication storage system according to one embodiment of the invention. For example, deduplication storage system 500 may be implemented as part of a deduplication storage system as described above, such as, for example, the deduplication storage system as shown in FIG. 1. In one embodiment, storage system 500 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 500 may have a distributed architecture, or all of its components may be integrated into a single unit. Storage system 500 may be implemented as part of an archive and/or backup system such as a deduplicating storage system available from EMC® Corporation of Hopkinton, Mass.

In one embodiment, storage system 500 includes a deduplication engine 501 interfacing one or more clients 514 with one or more storage units 510 storing metadata 516 and data objects 518. Clients 514 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 510 may be implemented locally (e.g., single node operating environment) or remotely (e.g., multi-node operating environment) via an interconnect, which may be a bus and/or a network. In one embodiment, one of storage units 510 operates as an active storage to receive and store external or fresh user data, while the another one of storage units 510 operates as a target storage unit to periodically archive data from the active storage unit according to an archiving policy or scheme. Storage units 510 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 510 may also be combinations of such devices. In the case of disk storage media, the storage units 510 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 516, may be stored in at least some of storage units 510, such that files can be accessed independent of another storage unit. Metadata of each storage unit includes enough information to provide access to the files it contains. In one embodiment, metadata may include fingerprints contained within data objects 518, where a data object may represent a data segment, a compression region (CR) of data segments, or a container of one or more CRs. Fingerprints are mapped to a particular data object via metadata 516, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication storage engine 501 includes file service interface 502, segmenter 504, duplicate eliminator 506, file system control 508, and storage unit interface 512. Deduplication storage engine 501 receives a file or files (or data item(s)) via file service interface 502, which may be part of a file system namespace 520 of a file system associated with the deduplication storage engine 501. The file system namespace 520 refers to the way files are identified and organized in the system. An example is to organize the files hierarchically into directories or folders, which may be managed by directory manager 522. File service interface 502 supports a variety of protocols, including a network file system (NFS), a common Internet file system (CIFS), and a virtual tape library interface (VTL), etc.

The file(s) is/are processed by segmenter 504 and file system control 508. Segmenter 504, also referred to as a content store, breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 508, also referred to as a file system manager, processes information to indicate the segment(s) association with a file. In some embodiments, a list of fingerprints is used to indicate segment(s) associated with a file. File system control 508 passes segment association information (e.g., representative data such as a fingerprint) to index 524. Index 524 is used to locate stored segments in storage units 510 via storage unit interface 512. Duplicate eliminator 506, also referred to as a segment store, identifies whether a newly received segment has already been stored in storage units 510. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 510 that make up the file. Segments are then packed by a container manager (which may be implemented as part of storage unit interface 512) into one or more storage containers stored in storage units 510. The deduplicated segments may be further compressed into one or more CRs using a variation of compression algorithms, such as a Lempel-Ziv algorithm before being stored. A container may contains one or more CRs and each CR may contain one or more deduplicated segments. A container may further contain the metadata such as fingerprints, type of the data segments, etc. that are associated with the data segments stored therein.

When a file is to be retrieved, file service interface 502 is configured to communicate with file system control 508 to identify appropriate segments stored in storage units 510 via storage unit interface 512. Storage unit interface 512 may be implemented as part of a container manager. File system control 508 communicates (e.g., via segmenter 504) with index 524 to locate appropriate segments stored in storage units via storage unit interface 512. Appropriate segments are retrieved from the associated containers via the container manager and are used to construct the requested file. The file is provided via interface 502 in response to the request. In one embodiment, file system control 508 utilizes a tree (e.g., a segment tree obtained from namespace 520) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 501 may be implemented in software, hardware, or a combination thereof. For example, deduplication engine 501 may be implemented in a form of executable instructions that can be stored in a machine-readable storage medium, where the instructions can be executed in a memory by a processor.

In one embodiment, storage system 500 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A computer-implemented method for improving cache utilization, the method comprising:
   in response to receiving a request to store data, storing the data in one of a plurality of cache slots of a cache;
   after storing the data, setting a status of the cache slot as write pending (WP) to indicate that the cache slot contains data which needs to be written to a corresponding destination storage device;
   determining an eviction type of the cached data based on whether the destination storage device is a local storage device or a remote storage device, wherein the eviction type includes one of a normal eviction type and an immediate eviction type, and the eviction type is determined to be an immediate eviction type if the destination storage device is a remote storage device;
   after copying data from the cache slot to the corresponding destination storage device, marking the cache slot with the determined eviction type; and
   in response to receiving another request to store data, evicting at least one of the cache slots according to an eviction schedule determined based on the corresponding eviction type, wherein a cache slot with the immediate type is evicted prior to a cache slot with the normal eviction type.

2. The method of claim 1, wherein a cache slot marked with immediate eviction is freed for reuse after a shorter duration of time than a cache slot marked with a normal eviction.

3. The method of claim 2, wherein marking a cache slot for normal eviction comprises setting a timestamp of the cache slot with a time of when the data is stored in the cache slot.

4. The method of claim 3, wherein marking a cache slot for immediate eviction comprises setting a timestamp of the cache slot with a value of zero.

5. The method of claim 1, further comprising:
   after copying data from the cache slot to the destination storage device, clearing the status of the cache slot to indicate that the cache slot no longer contains data which needs to be written to the corresponding destination storage device.

6. The method of claim 1, wherein evicting the at least one of the cache slots comprises:
   determining a set of one or more non-WP cache slots; and
   determining, from the determined set of one or more non-WP cache slots, a cache slot with a timestamp that contains a smallest value; and
   evicting the non-WP cache slot with the timestamp that contains the smallest value.

7. A non-transitory computer-readable medium having computer instructions stored therein, which when executed by a processor, cause the processor to perform operations comprising:
   in response to receiving a request to store data, storing the data in one of a plurality of cache slots of a cache;
   after storing the data, setting a status of the cache slot as write pending (WP) to indicate that the cache slot contains data which needs to be written to a corresponding destination storage device;
   determining an eviction type of the cached data based on whether the destination storage device is a local storage device or a remote storage device, wherein the eviction type includes one of a normal eviction type and an immediate eviction type, and the eviction type is determined to be an immediate eviction type if the destination storage device is a remote storage device;
   after copying data from the cache slot to the corresponding destination storage device, marking the cache slot with the determined eviction type; and
   in response to receiving another request to store data, evicting at least one of the cache slots according to an eviction schedule determined based on the corresponding eviction type, wherein a cache slot with the immediate type is evicted prior to a cache slot with the normal eviction type.

8. The non-transitory computer-readable medium of claim 7, wherein a cache slot marked with immediate eviction is freed for reuse after a shorter duration of time than a cache slot marked with a normal eviction.

9. The non-transitory computer-readable medium of claim 8, wherein marking a cache slot for normal eviction comprises setting a timestamp of the cache slot with a time of when the data is stored in the cache slot.

10. The non-transitory computer-readable medium of claim 9, wherein marking a cache slot for immediate eviction comprises setting a timestamp of the cache slot with a value of zero.

11. The non-transitory computer-readable medium of claim 7, further comprising:
    after copying data from the cache slot to the destination storage device, clearing the status of the cache slot to indicate that the cache slot no longer contains data which needs to be written to the corresponding destination storage device.

12. The non-transitory computer-readable medium of claim 7, wherein evicting the at least one of the cache slots comprises:
    determining a set of one or more non-WP cache slots; and
    determining, from the determined set of one or more non-WP cache slots, a cache slot with a timestamp that contains a smallest value; and
    evicting the non-WP cache slot with the timestamp that contains the smallest value.

13. A data processing system, comprising:
    a processor; and
    a memory to store instructions, which when executed from the memory, cause the processor to
        in response to receiving a request to store data, store the data in one of a plurality of cache slots of a cache,
        after storing the data, set a status of the cache slot as write pending (WP) to indicate that the cache slot contains data which needs to be written to a corresponding destination storage device,
        determine an eviction type of the cached data based on whether the destination storage device is a local storage device or a remote storage device, wherein the eviction type includes one of a normal eviction type and an immediate eviction type, and the eviction type is determined to be an immediate eviction type if the destination storage device is a remote storage device,
        after copying data from the cache slot to the corresponding destination storage device, mark the cache slot with the determined eviction type, and
        in response to receiving another request to store data, evict at least one of the cache slots according to an eviction schedule determined based on the corresponding eviction type, wherein a cache slot with the immediate type is evicted prior to a cache slot with the normal eviction type.

14. The data processing system of claim 13, wherein a cache slot marked with immediate eviction is freed for reuse after a shorter duration of time than a cache slot marked with a normal eviction.

15. The data processing system of claim 14, wherein marking a cache slot for normal eviction comprises setting a timestamp of the cache slot with a time of when the data is stored in the cache slot.

16. The data processing system of claim 15, wherein marking a cache slot for immediate eviction comprises setting a timestamp of the cache slot with a value of zero.

17. The data processing system of claim 13, wherein the processor is further configured to:
    after copying data from the cache slot to the destination storage device, clear the status of the cache slot to indicate that the cache slot no longer contains data which needs to be written to the corresponding destination storage device.

18. The data processing system of claim 13, wherein evicting the at least one of the cache slots comprises:
    determining a set of one or more non-WP cache slots; and
    determining, from the determined set of one or more non-WP cache slots, a cache slot with a timestamp that contains a smallest value; and
    evicting the non-WP cache slot with the timestamp that contains the smallest value.

* * * * *